(12) United States Patent
Li et al.

(10) Patent No.: US 9,275,289 B2
(45) Date of Patent: Mar. 1, 2016

(54) FEATURE- AND CLASSIFIER-BASED VEHICLE HEADLIGHT/SHADOW REMOVAL IN VIDEO

(71) Applicant: Xerox Corporation, Norwalk, CT (US)

(72) Inventors: Qun Li, Webster, NY (US); Edgar A. Bernal, Webster, NY (US); Matthew Shreve, Tampa, FL (US); Robert P. Loce, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 147 days.

(21) Appl. No.: 14/227,035

(22) Filed: Mar. 27, 2014

(65) Prior Publication Data

US 2015/0278616 A1     Oct. 1, 2015

(51) Int. Cl.
*G06K 9/00*     (2006.01)
*G06K 9/62*     (2006.01)
*G06T 7/00*     (2006.01)

(52) U.S. Cl.
CPC ........ *G06K 9/00825* (2013.01); *G06K 9/00744* (2013.01); *G06K 9/6269* (2013.01); *G06T 7/0081* (2013.01)

(58) Field of Classification Search
None
See application file for complete search history.

(56) References Cited

U.S. PATENT DOCUMENTS

2014/0003720 A1*   1/2014   Seow et al. .................... 382/173

OTHER PUBLICATIONS

U.S. Appl. No. 13/836,310, entitled "Methods and System for Automated In-Field Hierarchical Training of a Vehicle Detection System", filed Mar. 2013, by Wencheng Wu, et al.
U.S. Appl. No. 14/195,036, entitled "Method and Apparatus for Processing Image of Scene of Interest", filed August Mar. 3, 2014, by Qun Li, et al.
U.S. Appl. No. 13/973,330, entitled "System and Method for Object Tracking and Timing across Multiple Camera Views", filed Aug. 22, 2013, by Edgar A. Bernal, et al.

* cited by examiner

*Primary Examiner* — Atiba O Fitzpatrick
(74) *Attorney, Agent, or Firm* — Fay Sharpe LLP

(57) ABSTRACT

A method for removing false foreground image content in a foreground detection process performed on a video sequence includes, for each current frame, comparing a feature value of each current pixel against a feature value of a corresponding pixel in a background model. The each current pixel is classified as belonging to one of a candidate foreground image and a background based on the comparing. A first classification image representing the candidate foreground image is generated using the current pixels classified as belonging to the candidate foreground image. The each pixel in the first classification image is classified as belonging to one of a foreground image and a false foreground image using a previously trained classifier. A modified classification image is generated for representing the foreground image using the pixels classified as belonging to the foreground image while the pixels classified as belonging to the false foreground image are removed.

16 Claims, 11 Drawing Sheets

FEATURE- AND CLASSIFIER-BASED VEHICLE HEADLIGHT/SHADOW REMOVAL IN VIDEO

BACKGROUND

The present disclosure relates to a system and method for removing false foreground image content, such as headlight and shadows that may distort an object, in a foreground detection process performed on a video sequence. While the present disclosure is contemplated for use in projects concerning Video Analytics for Retail ("VAR") including, inter alia, merge point management and measurement of drive-thru total experience time ("TET"), it is appreciated that the present exemplary embodiments are also amendable to other like applications.

A detection of foreground objects and/or moving objects ("foreground/moving objects") is part of a video-based object tracking operation used in computer vision applications, such as surveillance and traffic monitoring, etc. Example applications can include, inter alia, vehicle speed estimation, automated parking monitoring, vehicle and pedestrian counting, traffic flow estimation, measurements of vehicle and pedestrian queue statistics, and TET measurements in retail spaces, etc.

Two of the most common methods of motion detection used in applications that perform analytics on video data include frame-to-frame differencing and background estimation and subtraction ("background subtraction"). The frame differencing approach detects moving objects, typically by requiring tuning to a very narrow range of object speed relative to the frame rate and camera geometry. The background subtraction approach detects foreground objects rather than moving objects. However, moving objects can trigger foreground detection because their appearance differs from the background estimate. Background subtraction is more flexible in terms of adjusting the time scale and dynamically adjusting parameters in the background modeling. Although the term "subtraction" refers to a 'minus' operation in arithmetic, it often refers to the removal of a component of an image in computer vision and video processing applications. As such, the term can refer to operations including pixel-wise subtractions ('minusi' operation) between images and pixel-wise fit tests between an image and a set of corresponding statistical models.

Still, one challenge associated with the detection of foreground/moving objects is a removal of false foreground objects. Shadows or vehicle headlights (either the light itself or its reflection on the ground)—both cast by and moving with an object across a scene—may cause problems in computer vision applications when the shadow and/or headlight pixels cast from the moving objects are misidentified as foreground pixels. Mainly, the appearance of shadow and/or headlight pixels differs from the background, making the pixels detectable as foreground objects. Also, the shadows and/or headlights have patterns of motion similar to the objects casting them, thus triggering false foreground object detections. Shadows can be especially problematic when they touch other moving objects in the scene. FIG. 1A shows an example scenario where the shadow 12 of a first vehicle 14 touches a second vehicle 16 in the scene, thereby making it difficult to identify the first and second vehicles 14, 16 as separate moving objects. Headlights can also be problematic where the ground reflection is not connected to the moving object casting the light. FIG. 2 shows an example scenario where the ground reflection is identified (by virtual box 18) as a first object and the vehicle 20 casting it is identified as a separate object.

Almost all existing approaches (e.g., deterministic or statistical, model- or non-model-based in terms of the decision process) exploit a large set of assumptions to limit complexity. An example of a color-based method relies on heuristic assumptions made about the color characteristics of shadows. At the same time, these approaches are highly scene-dependent because they rely on carefully selected parameters either in the shadow model or the decision threshold. This dependency limits their accuracy and extensibility to different types of scenarios. Furthermore, most existing shadow detection algorithms are error-prone because they operate on, and make pixel-wise decisions for, each pixel in an originally detected foreground mask, which can be time-consuming.

Little work has been done to address false foreground detection caused by headlights during nighttime. In one existing approach, inside a lane, the pixels corresponding to a line perpendicular to the lane are summed, and if all non-background pixels correspond to the highlight category, then those pixels are set to background. However, unlike the present disclosure, the removal of headlight reflection in this approach depends on fixed lane geometry.

In an existing on-board system that uses a camera mounted to a vehicle, headlight reflection is fixed within the camera field of view and, is thus, easily removed. However, this approach is not applicable in a setting where the reflectance area moves with respect to the camera field of view.

In a different, luminance-based, approach, headlight reflection is removed by adjusting light properties, such as, luminosity, contrast, and intensity, to eliminate diffused reflections on the road. The headlight is then used to detect the vehicle by grey value. However, this approach is insufficient for detecting vehicles viewed at arbitrary angles in an environment without regularized motion patterns.

Other existing approaches use an exponential model and a Reflection Intensity Map and a Reflection Suppression Map to track and pair headlights with vehicles. These approaches are complicated.

A simpler method and system is desired for accurately detecting a vehicle in the presence of shadows and headlight reflection.

INCORPORATION BY REFERENCE

The disclosure of co-pending and commonly assigned U.S. Ser. No. 13/836,310, entitled "Methods and System for Automated In-Field Hierarchical Training of a Vehicle Detection System", filed March, 2013, by Wencheng Wu, et al., is totally incorporated herein by reference.

The disclosure of co-pending and commonly assigned U.S. Ser. No. 14/195,036, entitled "Method and Apparatus for Processing Image of Scene of Interest", filed August Mar. 3, 2014, by Qun Li, et al., is totally incorporated herein by reference.

The disclosure of co-pending and commonly assigned U.S. Ser. No. 13/973,330, entitled "System and Method for Object Tracking and Timing across Multiple Camera Views", filed Aug. 22, 2013, by Edgar A. Bernal, et al., is totally incorporated herein by reference.

BRIEF DESCRIPTION

The present disclosure relates to a method and system for removing headlight and/or shadow in a model-based foreground detection via background estimation and subtraction.

The disclosure relies on feature extraction and the use of a trained classifier for identifying pixels containing shadows and/or highlights from the extracted features.

One embodiment relates to a method for removing false foreground image content in a foreground detection process performed on a video sequence. The method includes receiving video data from a sequence of frames taken from an associated image capture device monitoring a scene of interest. For a current frame, the method includes comparing a current feature value of each current pixel against a feature value of a corresponding pixel in a background model of the scene of interest. The method includes classifying the each current pixel as belonging to one of a candidate foreground image and a background based on the comparing. The method includes generating a first classification image representing the candidate foreground image using current pixels classified as belonging to the candidate foreground image. The method includes classifying the each pixel in the first classification image as belonging to one of a foreground image and a false foreground image using a previously trained classifier. The method includes generating a modified classification image representing the foreground image using the pixels classified as belonging to the foreground image and removing pixels classified as belonging to the false foreground image.

Another embodiment of the disclosure relates to a system for removing false foreground image content in a video sequence. The system includes a false foreground image detection device including a memory and a processor in communication with the memory. The processor is configured to receive video data from a sequence of frames taken from an associated image capture device monitoring a scene of interest. For a current frame, the processor compares a current feature value of each current pixel against a feature value of a corresponding pixel in a background model of the scene of interest. The processor is configured to classify the each current pixel as belonging to one of a candidate foreground image and a background based on the comparing. The processor generates a first classification image representing the candidate foreground image using current pixels classified as belonging to the candidate foreground image. The processor classifies the each pixel in the first classification image as belonging to one of a foreground image and a false foreground image using a previously trained classifier. A modified classification image is generated for representing the foreground image using the pixels classified as belonging to the foreground image, while the pixels classified as belonging to the false foreground image are removed.

DETAILED DESCRIPTION

The present disclosure relates to a system and method for removing false foreground image content, such as headlight and shadows that may distort the outline of a segmented object, in a foreground detection process performed on an image or a video sequence. Herein, the terms "incoming frame" and/or "current frame" refer to a video frame that is currently being processed for foreground/motion detection. This processing can be focused on a region of interest ("ROI") within the frame.

The term "headlight" can include "headlight reflection", "headlight road reflection", and "ground reflection", and generally refers to a field of space illuminated by a (vehicle) headlight or headlamp. However, the term can also refer to light cast from lighting devices, such as jogger headlamps, carried or worn on pedestrians. The type and/or source of headlight contemplated herein can is not limited to any one scenario. For example, embodiments are contemplated where the field of space includes other illuminated objects and weather-related phenomenon such as illuminated fog.

The terms "background image" or "estimated background" refer to an image having the same pixel dimensions as the current frame. The background image contains a current estimate of a background in the form of pixel-wise statistical models of the historical values of every pixel (e.g., a mixture of Gaussians). These statistical models are maintained throughout the duration of the foreground detection task and updated with every incoming frame. In order to convert this pixel-wise model set to an image representation, single values representative of the distribution can be selected. For example, each pixel value in the background frame may be assigned a value equal to the weighted sum of means of the individual Gaussian components. In another embodiment, the mode, the median, or more generally, a statistic representative of the distribution can be used.

The terms "foreground image" and/or "foreground mask" refer to a classification mask, such as, for example, a binary mask, with pixel values equal to one (1) at coordinates corresponding to a location of a detected foreground pixel. It should be noted that alternative labeling and/or representations of the foreground mask can be used, as long as pixel values corresponding to the detected foreground object have a label that distinguishes it from the background.

The terms "background subtraction" and/or "foreground detection" refer to a process where the foreground image is computed—i.e., the process by which foreground areas in the current frame are identified. This process can be performed, for example, by applying a pixel-wise statistical fit test between the values in the current frame and the statistical models in the background frame, followed by thresholding, and optional morphological filtering. Alternatively, when a background image is extracted from the background model, pixel-wise subtraction can be used as a means of comparison.

Figure 3:
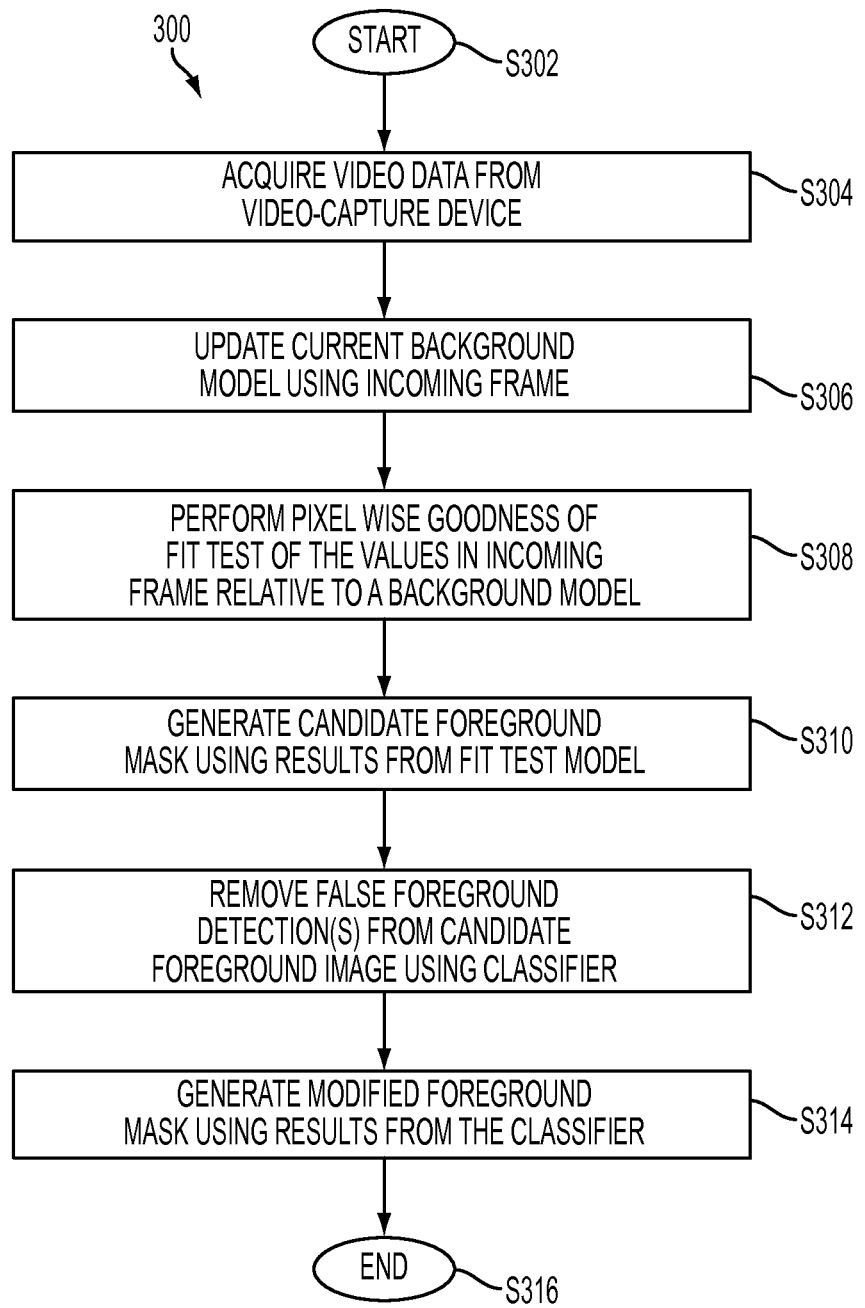
FIG. 3 is an overview of a method for removing false foreground image content in a foreground detection process.

FIG. 3 is an overview of a method 300 for removing false foreground image content in a foreground detection process. The method starts at S302. A video acquisition module acquires video data from a video-capture device at S304. The video data can be acquired as live video from the image capture device. Alternatively, the module can acquire the video as files stored in a storage medium. The module can read the files and provide the video data to at least one of the background model update module and the comparison module.

The background model update module updates a background model at S306 using a current (i.e., most recent video) frame in the incoming video data and a current background model at S306.

The comparison module performs a comparison between the current frame and a background estimate. For example, in one embodiment the module can perform a pixel-wise goodness of fit test of the values in each (ROI in an) incoming frame relative to the background model at S308. The module generates a classification mask, such as a binary (candidate) foreground mask, using the results from the comparison module at S310. The classification mask may contain, in addition to the detected foreground objects, any headlights and/or shadows which are present in the scene and which are detected as being different in appearance from the corresponding background pixel values. The mask is provided to the false foreground detection removal module as a candidate foreground image. In another embodiment, the comparison module can implement the comparison using a pixel-wise subtraction approach between the incoming frame and the image representation of the background model. The module can further perform a thresholding operation on the results of the comparison.

The false foreground detection removal module removes false foreground detections—i.e., shadows and/or highlights—from the candidate foreground image using a classifier at S312. More specifically, the module applies a previously trained classifier to the mask in a block-wise manner to distinguish true foreground objects from spurious shadows and headlights—i.e., false detections. The module generates a modified classification mask—such as a modified binary mask—at S314 representing the true foreground objects while removing and excluding the headlight and/or shadow pixels. The method ends at S316.

Figure 4:
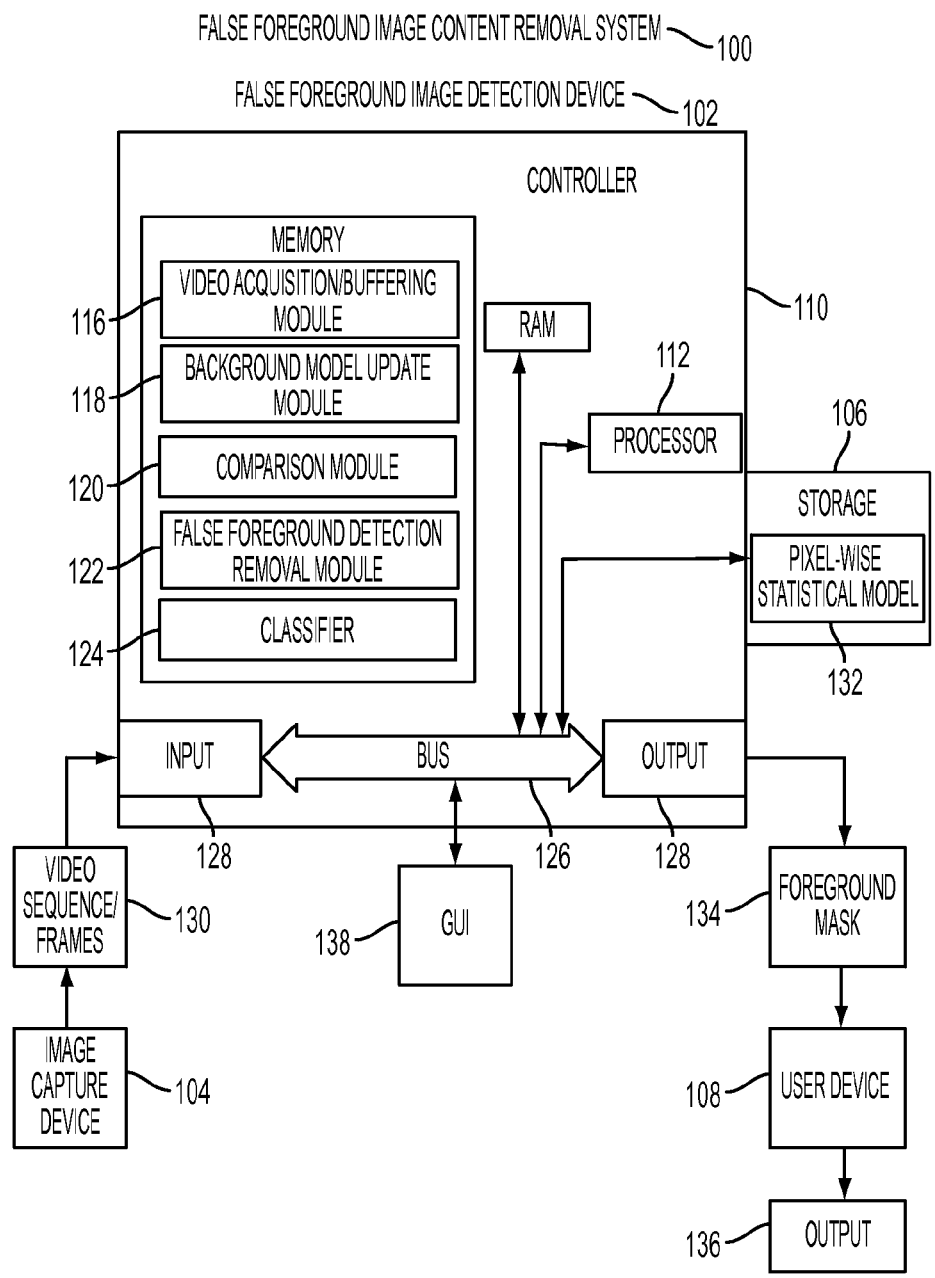
FIG. 4 is a schematic illustration of a system for removing false foreground image content in a video sequence according to one exemplary embodiment.

FIG. 4 is a schematic illustration of a system 100 for removing false foreground image content in a video sequence according to one exemplary embodiment. The system includes a false foreground image detection device 102, an image capture device 104, and a storage device 106, which may be linked together by communication links, referred to herein as a network. In one embodiment, the system 100 may be in further communication with a user device 108. These components are described in greater detail below.

The device 102 illustrated in FIG. 4 includes a controller 110 that is part of or associated with the device. The exemplary controller 110 is adapted for controlling an analysis of video data received by the system 100 by classifying the pixels in each incoming frame and generating a foreground mask representing foreground objects based on the classifications. The controller 110 includes a processor 112, which controls the overall operation of the device 102 by execution of processing instructions that are stored in memory 114 connected to the processor 112.

The memory 114 may represent any type of tangible computer readable medium such as random access memory (RAM), read only memory (ROM), magnetic disk or tape, optical disk, flash memory, or holographic memory. In one embodiment, the memory 114 comprises a combination of random access memory and read only memory. The digital processor 112 can be variously embodied, such as by a single-core processor, a dual-core processor (or more generally by a multiple-core processor), a digital processor and cooperating math coprocessor, a digital controller, or the like. The digital processor, in addition to controlling the operation of the determination device 102, executes instructions stored in memory 114 for performing the parts of the method outlined in FIGS. 3 and 5. In some embodiments, the processor 112 and memory 114 may be combined in a single chip.

The false foreground image detection device 102 may be embodied in a networked device, such as the image capture device 104, although it is also contemplated that the device 102 may be located elsewhere on a network to which the system 100 is connected, such as on a central server, a networked computer, or the like, or distributed throughout the network or otherwise accessible thereto. The phases disclosed herein are performed by the processor 112 according to the instructions contained in the memory 114. In particular, the memory 114 stores a video acquisition/buffer module 116, which acquires video data from a sequence of frames taken from an image capture device monitoring a scene of interest; a background model update module 118, which updates a background model using the current frame in the video data and a current background model; a comparison module 120, which compares each pixel in a current frame against a background model for classifying the pixel as belonging to one of a candidate foreground image and a background, and generates a first classification mask representing the candidate foreground image; a false foreground detection removal module 122, which classifies each pixel in the first mask as belonging to one of a foreground image and a false foreground detection, and generates a modified classification mask representing the foreground image while removing the false foreground content; and, a classifier 124, which segments the candidate foreground image into pixel blocks and outputs a binary decision for each pixel block. Embodiments are contemplated wherein these instructions can be stored in a single module or as multiple modules embodied in the different devices. The modules 116-124 will be later described with reference to the exemplary method.

The software modules as used herein, are intended to encompass any collection or set of instructions executable by the false foreground image detection device 102 or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server (not shown) or other location to perform certain functions. The various components of the device 102 may be all connected by a bus 126.

With continued reference to FIG. 4, the false foreground image detection device 102 also includes one or more communication interfaces 128, such as network interfaces, for communicating with external devices. The communication interfaces 128 may include, for example, a modem, a router, a cable, and and/or Ethernet port, etc. The communication interfaces 128 are adapted to receive video and/or video data 130 as input.

The false foreground image detection device 102 may include one or more special purpose or general purpose computing devices, such as a server computer or digital front end (DFE), or any other computing device capable of executing instructions for performing the exemplary method.

FIG. 4 further illustrates the false foreground image detection device 102 connected to an image source 104 for inputting and/or receiving the video data and/or image data (hereinafter collectively referred to as "video data") in electronic format. The image source 104 may include an image capture device, such as a camera. The image source 104 can include one or more surveillance cameras that capture video data from a region of interest. For performing the method of headlight removal at night in ROIs without external sources of illumination, the cameras 104 can include near infrared (NIR) capabilities at the low-end portion of a near-infrared spectrum (700 nm-1000 nm). No specific requirements are needed regarding spatial or temporal resolutions. The image source, in one embodiment, can include a surveillance camera with a video graphics array size that is about 1280 pixels wide and 720 pixels tall with a frame rate of thirty (30) or more frames per second.

In one embodiment, the image source 104 can be a device adapted to relay and/or transmit the video captured by the camera to the false foreground image detection device 102. For example, the image source 104 can include a camera sensitive to visible light or having specific spectral sensitivities, a network of such cameras, a line-scan camera, a computer, a hard drive, or other image sensing and storage devices. In another embodiment, the video data 130 may be input from any suitable source, such as a workstation, a database, a memory storage device, such as a disk, or the like. The image source 104 is in communication with the controller 110 containing the processor 112 and memories 114.

With continued reference to FIG. 4, the system 100 includes a storage device 106 that is part of or in communication with the false foreground image detection device 102. In a contemplated embodiment, the false foreground image detection device 102 can be in communication with a server (not shown) that includes a processing device and memory, such as storage device 106, or has access to a storage device 106, for storing at least one pixel-wise statistical model 132.

With continued reference to FIG. 4, the video data 130 undergoes processing by the false foreground image detection device 102 to output a binary mask 134 representing foreground objects included in the incoming frame. The system 100 is operative to apply the mask to an algorithm for outputting a determination 136. In one embodiment, the system 100 can provide the user device 108 with the binary mask for generating the output 136.

Furthermore, the system 100 can display the binary mask and/or the output in a suitable form on a graphic user interface (GUI) 138. The GUI 138 can include a display for displaying the information, to users, and a user input device, such as a keyboard or touch or writable screen, for receiving instructions as input, and/or a cursor control device, such as a mouse, touchpad, trackball, or the like, for communicating user input information and command selections to the processor 112.

Figure 1:
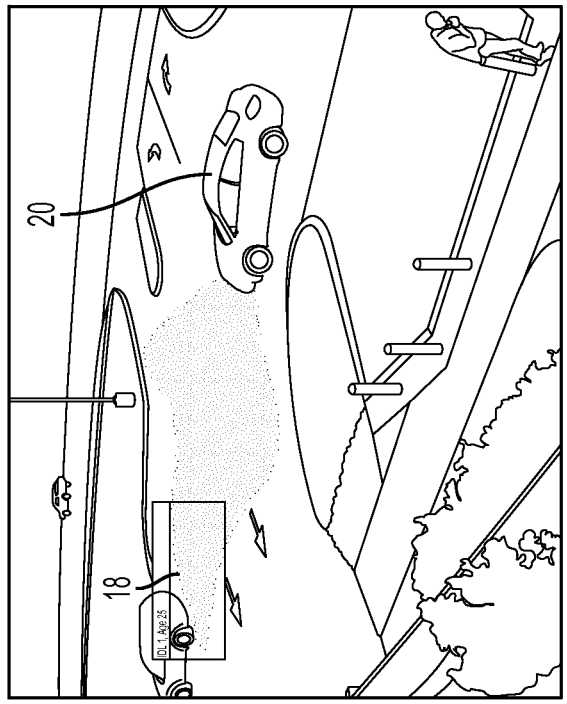
FIG. 1 shows an example scenario where the shadow makes it difficult to identify first and second vehicles as separate moving objects.
Figure 2:
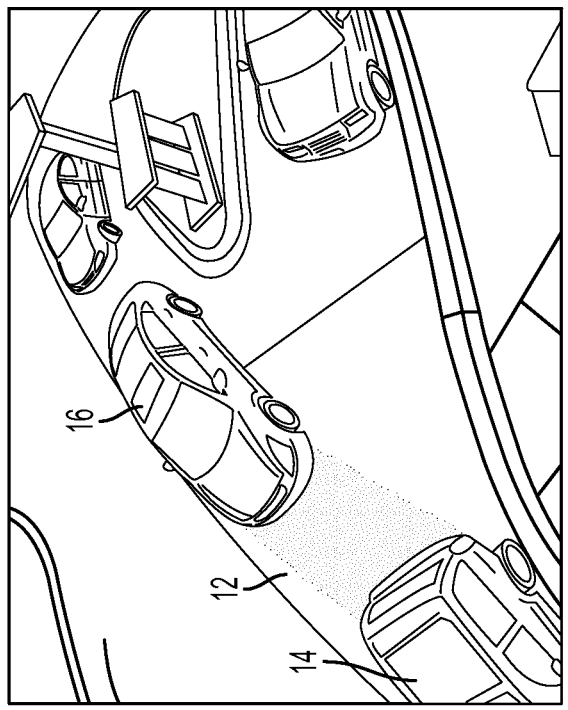
FIG. 2 shows an example scenario where ground reflection is identified as a first object and the vehicle casting the headlight is identified as a separate object.
Figure 5:
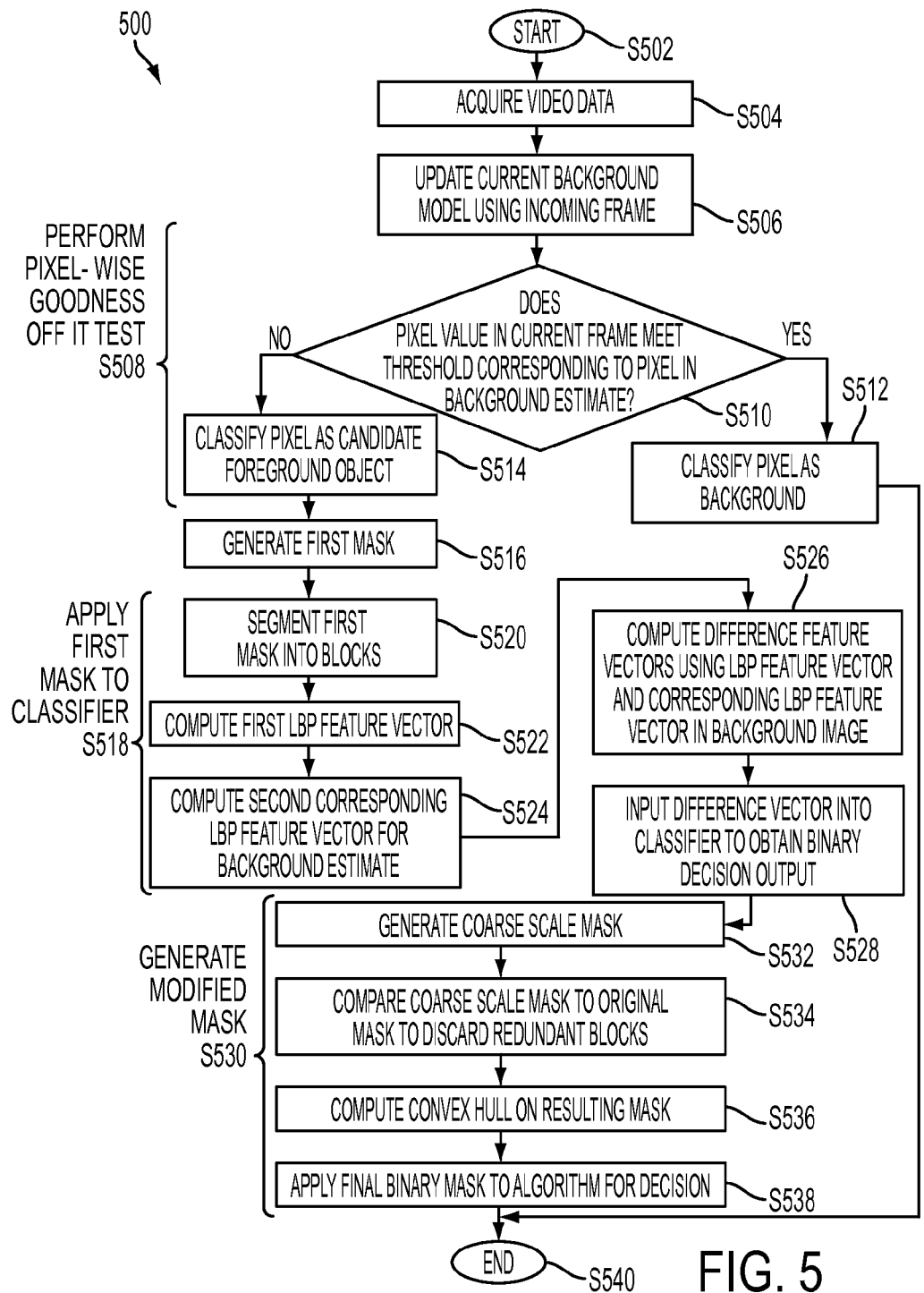
FIG. 5 shows a method for removing false foreground image content in a foreground detection process performed on a video sequence.

FIG. 5 shows a method 500 for removing false foreground image content in a foreground detection process performed on a video sequence. The method starts at S502. The video acquisition (and/or buffering) module 116 receives video and/or video data in the form of a sequence of frames taken from an image capture device monitoring a region of interest at S504. Alternatively, the module 116 can acquire the video frames from a storage medium storing the video data. FIGS. 1 and 2 show example frames captured with a surveillance camera in response to the detection of motion by a sensor in communication with the image capture device. In one example, the virtual box 18, shown in FIG. 2, encloses a region where the motion is detected.

The following operation is performed on each or selected ones of incoming ("current") frames). At S506, a background model update module 118 updates a current background model using the current frame. In the contemplated embodiment, the module 118 uses an auto-regressive process to update the current background model, wherein attributes of the incoming frame are incorporated into the model via a learning parameter which controls the model update or learning rate.

Strategies used to maintain a background model or estimate include Gaussian mixture models, median filtering, etc. Ideally, background subtraction should detect, and extract pixels of, tangible foreground and moving objects with high accuracy while limiting detection of spurious objects—such as cast shadows, headlights, and noise—that result in false positives. The approach used to maintain the background model in the contemplated embodiment focuses on statistical models, where each model describes background pixel behavior for corresponding pixels at a select location. Statistical models can be more robust than other adaptive methods, such as, temporal frame averaging or median frame computation (which are effectively single-parameter statistical models). While less computationally intensive, temporal frame averaging is incapable of supporting wide ranges of speeds of motion and accurately describing background images when their distributions are not unimodal.

In the contemplated embodiment, a historical statistical model (e.g., a parametric density model, such as, a Gaussian Mixture Model (GMM) based approach or a non-parametric density model, such as, a kernel-based estimate) for each pixel is constructed. In the contemplated embodiment, the background estimate can be continuously updated with each incoming frame at a rate controlled by a predetermined learning rate factor. However, embodiments are contemplated where the background estimate can be updated at slower rates. Other alternatives are also contemplated for constructing the current background model.

In greater detail, the background updating operation relies on a background model that is previously initialized when parameters that best describe the mixture of Gaussians (mean vectors and covariance matrices for each Gaussian component) for every pixel are determined. A background image/estimate—an image representation of the statistical background model—may be computed as part of the initialization process. The updating component of the operation includes incorporating each pixel value in the frame or ROI into its respective mixture model.

In one embodiment, a mixture of Gaussians includes mean vectors and covariance matrices for each Gaussian component, as well as a weight factor for each component that describes its importance relative to the other components. The weight factor, mean and standard deviation/covariance estimates for matching distributions can be updated by the updating component of the operation. In one embodiment, if no component of the distribution matches the current pixel, the least probable distribution in the mixture can be replaced with a distribution with mean equal to the incoming pixel value. To reflect confidence in the newly added component, the replacement distribution also can include an arbitrarily high variance and a small weighting factor. Other processes for updating the background can be used.

Returning to FIG. 5, the comparison module 120 performs a comparison between the current frame and the estimated background received from the background model update module at S508. In other words, a current feature value of each pixel in the current frame, or a ROI in the current frame, is compared against the background model generated using at least one previous frame. This comparison is performed to determine whether a select pixel in the ROI belongs to the background or to a foreground object, whereby it is treated in the current operation as a candidate foreground object. Particularly, the feature value can represent the pixel's RGB value (grayscale value in the case of grayscale processing). In the contemplated embodiment, the feature value can represent one of color and texture. Particularly, the color value of the current pixel is compared to a threshold corresponding to a component in the corresponding Gaussian mixture at S510. In the contemplated embodiment, the threshold represents a predetermined number of standard deviations. In an illustrative embodiment, the module 120 can determine if the color value is within three (3) standard deviations of any component in its corresponding Gaussian mixture. In response to the current feature value meeting the threshold corresponding with a pixel in a background estimate (YES at S510), the pixel is classified as belonging to the background at S512. Use of other fit tests is possible. In response to the current feature value not meeting the threshold (NO at S510), the current pixel is classified as belonging to a candidate foreground image at S514.

The module 120 generates a first classification (e.g., binary) image/mask representing the candidate foreground image using the current pixels classified as belonging to the candidate foreground image at S516. Generally, the module 120 assigns the pixels belonging to the background with a "0" (OFF) binary value and the pixels belonging to the candidate foreground image with a "1" (ON) binary value. The first binary image is generated using the ON values. However, other labeling can be used where the candidate foreground is assigned a label that distinguishes it from the background.

To remove the effect of noise and spurious sources of motion, as well as to fill any holes that occur in foreground objects, this module 120 can additionally implement morphological operations such as erosions, dilations, openings, closings, hole filling and a convex hull determination.

In a conventional approach, the foreground objects included in the generated classification mask are applied to an algorithm for outputting a determination dependent on the desired computer application, which examples can include a vehicle speed estimation, automated parking monitoring, vehicle and pedestrian counting, traffic flow estimation, measurements of vehicle and pedestrian queue statistics, and TET measurements in retail spaces, etc. For example, the classification mask can be provided as input and the determination and/or output can indicate that the foreground image is representative of a stationary vehicle occupying space in a monitored parking region of interest and, furthermore, that the vehicle is in violation of a select regulation (where the application relates to determining violations), etc.

Applying foreground objects having an incorrect outline or boundary to the algorithm can result in a faulty and/or incorrect determination and/or output. However, the foreground objects used in the conventional approach can include pixels affected by headlights and shadows, and thus be defined by an incorrect profile. These pixels are included in the classification mask as foreground objects because they are detected as changes in appearance within a current frame relative to the background reference. The appearance of these pixels can result in significantly different RGB values relative to the background frame, making them detectable.

One aspect of the present disclosure is to treat the foreground objects represented in the classification mask as candidate foreground objects and apply the candidate foreground objects to further operations. A false foreground detection removal module 122 uses a previously trained classifier to classify each pixel in the first classification mask as belonging to one of a true foreground image and a false foreground image at S518. This module 122 receives the first classification mask generated by the comparison module 120 and applies the classifier in a block-wise manner.

Figure 6:
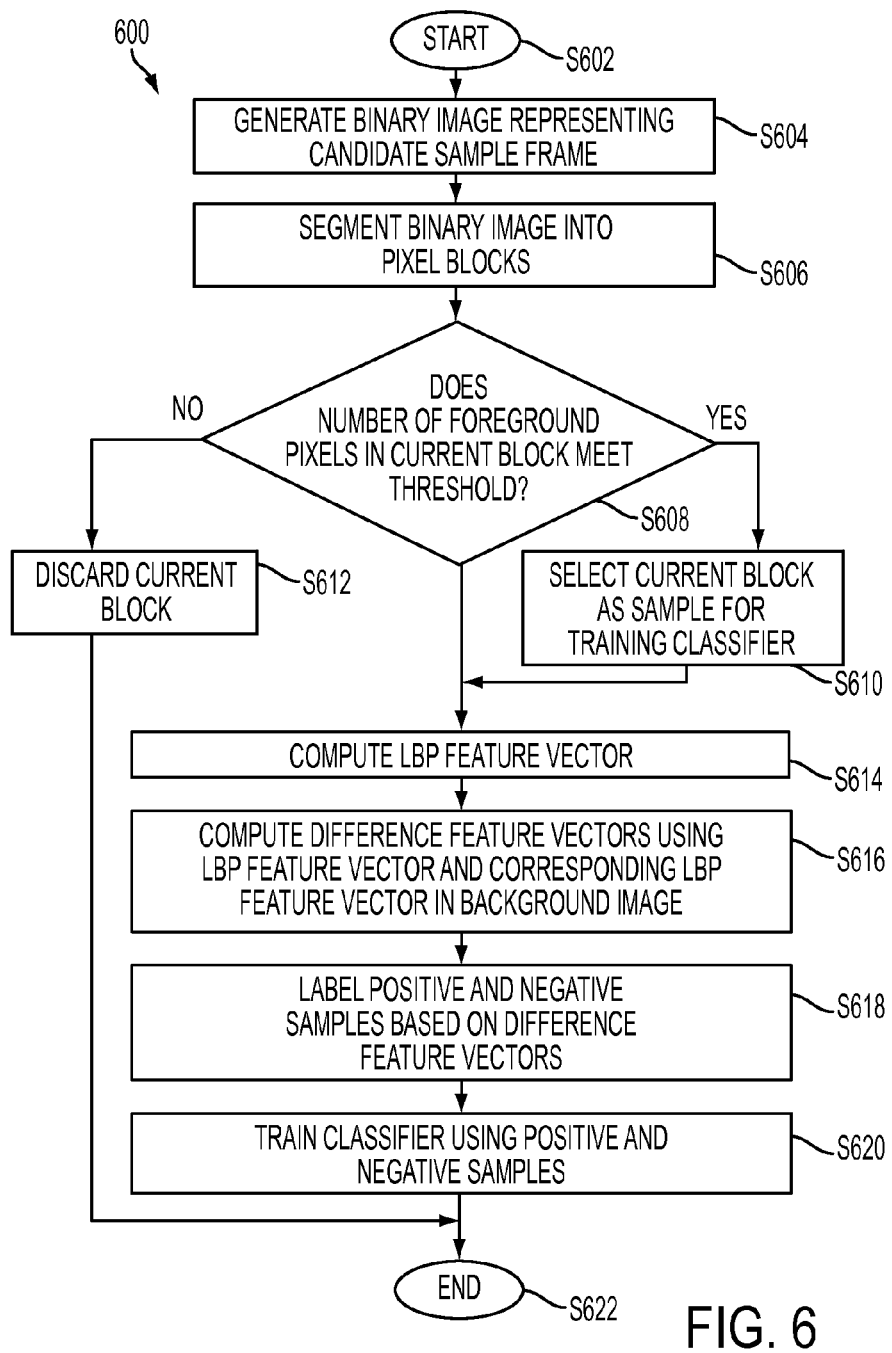
FIG. 6 shows a method for training the classifier to distinguish between true foreground objects and false foreground detections.

FIG. 6 is a flowchart describing a method 600 for training a classifier 124. The method starts at S602. In the discussed embodiment, the false foreground detection removal module 122 can train the classifier before the process described in FIG. 5 is performed. However, any additional or substitute module may be utilized to perform the same function.

The purpose of the classifier is to discriminate between two classes. In the current disclosure, the classes include true foreground objects—such as, moving and stationary vehicles and pedestrians, etc.—and spurious foreground objects—such as false detections caused headlights and/or shadows, etc. Furthermore, a false detection can include a spurious foreground object connected to a true foreground object, which causes the outline or boundary of the true foreground object to be incorrect, i.e., to appear larger than the accurate size.

The training of the classifier 124 is performed using a series of sample frames. The training samples can be manually or automatically collected for the both classes. Candidate sample frames can be identified through the output of the comparison module 120. For example, the module 120 can keep any current frame and background estimate as candidate frames when it detects a foreground object. A model-based vehicle detection algorithm or a non-model based vehicle detector can be applied to separate the region that contains the true foreground objects—for creating positive training samples—from the spurious objects—for creating the negative training samples. The disclosure of co-pending and commonly assigned U.S. Ser. No. 13/836,310, entitled "Methods and System for Automated In-Field Hierarchical Training of a Vehicle Detection System", filed March, 2013, by Wencheng Wu, et al., teaches a non-model based vehicle detector approach and is totally incorporated herein by reference.

However, these algorithms used for automatic sample collection in the training phase can be rather time and resource consuming and can lead to potentially inaccurate results. Accordingly, the present disclosure improves the training approach.

Figure 7A:
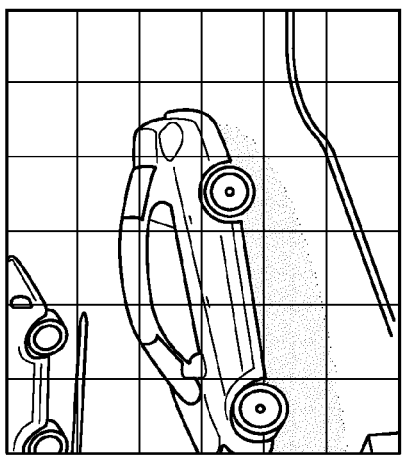
FIGS. 7A and 8A show sample frames that are segmented into blocks for training a classifier.

More particularly, similar to the process described above at S506-S516 in FIG. 5, a foreground image (such as, for example, a classification or binary mask) is generated for representing foreground objects in a sample frame at S604. The foreground image/mask is segmented into a number of non-overlapping pixel blocks at S606. FIG. 7A shows a sample frame that is segmented into blocks. In the contemplated embodiment, the foreground image/mask can be divided into a number of equal-sized N×N blocks, but there is no limitation made on the size and shape of each block. In the limiting cases, N can be equal to 1 or to the dimensions of the image. The blocks can be of unequal sizes or different shapes in other embodiments. The length of one side of the block N can be based on the typical size of a vehicle in the scene and the coarse/fine level of the detection, depending on certain applications. In other words, N can be based on camera resolution and camera viewing geometry. In one contemplated embodiment, however, the pixel blocks can be segmented into 1×1 pixel blocks each representing a single pixel.

Figure 7B:
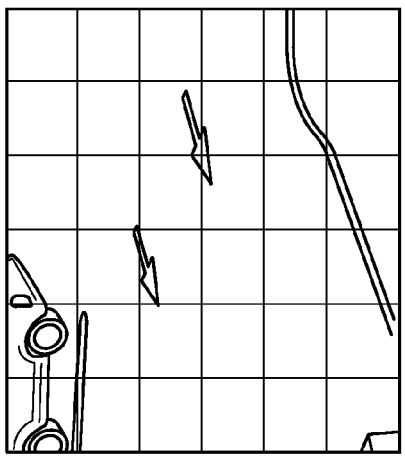
FIGS. 7B and 8B show background images corresponding to the respective sample frames in FIGS. 7A and 8A segmented into blocks.
Figure 7C:
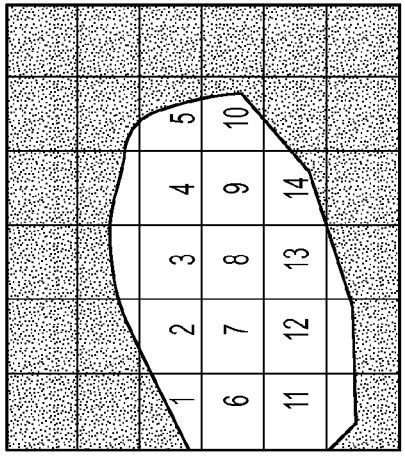
FIGS. 7C and 8C show foreground masks corresponding to the respective sample frames in FIGS. 7A and 8A segmented into blocks using conventional methods.

Next, the module (122 or any similar performing module) training the classifier determines sample blocks. Mainly, the module 122 bases this determination on the number of foreground pixels represented in a current block. However, embodiments are contemplated where the candidate sample blocks can, in certain embodiments, meet other parameters before being selected as actual sample blocks for the training. In the discussed embodiment, only the blocks that include at least a predetermined number of detected foreground pixels are selected as samples for the training phase. In one contemplated embodiment, the predetermined number of detected foreground pixels can approximate $N^2/2$, although there is no limitation made herein to the threshold number. For example, the sample frame shown in FIG. 7A is segmented into 36 blocks (6×6), and FIG. 7C shows that the number of blocks including detected foreground pixels is 14. As part of this paring down operation, the module 122 can count the number of foreground pixels present in a current block and determine whether the parameter is met at S608. In response to the number of foreground pixels meeting the threshold (YES at S608), the block is selected as a valid sample block for training the classifier at S610. In response to the number foreground pixels in the current block not meeting the threshold (NO at S608), the block is discarded at S612. This determination is made for each segmented block in the frame.

Next, the module 122 computes a feature of each one of the sample blocks, where the feature corresponds to the object at S614. Using FIG. 7C as an illustrative example, where blocks labeled 1-10 correspond to vehicle body (72 in FIG. 7A) and blocks 11-14 correspond to cast shadows (74 in FIG. 7A). For each block (1-10) corresponding to the vehicle 72, a feature descriptor $v_1$ in the video frame and the corresponding feature descriptor in the background image $v_2$ are computed. In one embodiment, the descriptors used can be indicative of textural features. Examples of such features include Local Binary Patterns (LBP), histogram of oriented gradients (HOG), Gabor decompositions, wavelet, Fourier or Discrete Cosine Transform representations, among others. FIG. 7B shows a segmented frame representing the background image corresponding to the sample frame in FIG. 7A, wherein LBP features are used as textural features. Similarly, for each block (11-14) corresponding to the shadow 74, an LBP feature vector (normalized histogram) $v_1'$ in the video frame and the corresponding LBP feature vector in the background image $v_2'$ are computed.

The LBP feature vector represents texture in the discussed embodiment. Furthermore, the feature is invariant to monotonic transformations of color intensities. An assumption used herein is that headlights and/or shadows do not change the texture of the background, in general. While the training and the application of the classifier are discussed in terms of texture-related features, the use of other features is possible. Embodiments are contemplated where other texture descriptors, such as, Gabor, histogram of oriented gradients (HOG), and edge descriptors, etc., can be used instead or in addition to LBP. In the case of LBP, the resulting feature vectors $v_1$ are histograms, so other histogram similarity/dissimilarity/divergence metrics can potentially be used as features.

Conventional texture-based approaches which aim at identifying a true foreground (vehicle) object attempt to differentiate between the texture of the vehicle's body part and that of a non-vehicle (e.g., ground, shadow, etc.). However, the difference between the texture of the background lit by headlights or affected by shadows and the same background area being unaffected by either factor is usually substantially smaller than the difference between the background area and a foreground object. In the current embodiment, a difference feature vector is calculated to represent the difference between the two vectors. This difference feature vector is used to train the classifier. More particularly, the difference feature vector is used to discriminate between relatively small versus large differences between the texture in a detected foreground object and a background.

The difference feature vectors are computed at S616 between the current feature vector and a corresponding feature vector for the same block in a background estimate. Next, each difference feature vector is labeled as corresponding to one of a positive sample (i.e., a true foreground object) and a negative sample (false foreground object) at S618. In other words, the difference feature vectors v1-v2 corresponding to blocks representing the vehicle are treated as positive samples. The difference feature vectors $v_1'$-$v_2'$ corresponding to blocks representing the shadow are treated as negative samples.

Figure 8A:
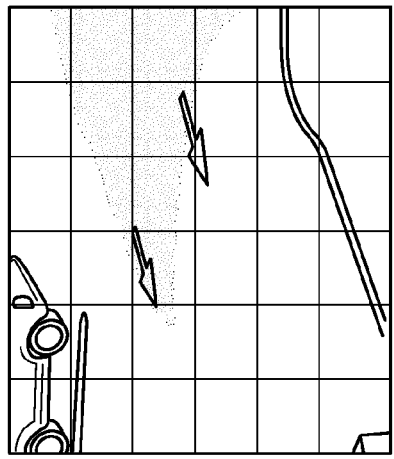
Figure 8B:
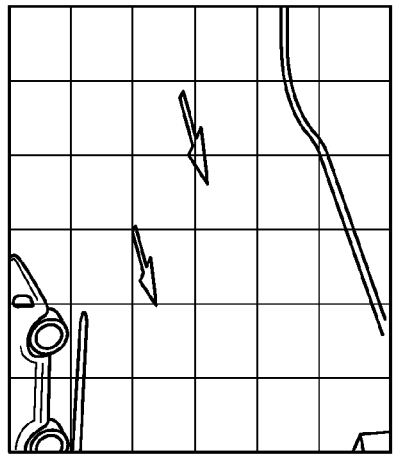
Figure 8C:
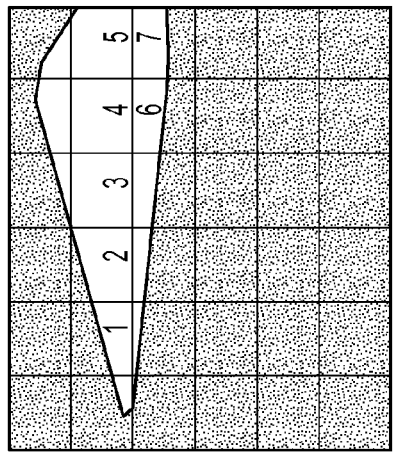

Negative training samples can also be generated using sample frames including foreground objects being detected in regions by headlights. Using FIG. 8C as another illustrative example, blocks labeled 1-7 correspond to headlights 82 in the sample frame shown in FIG. 8A. FIG. 8B shows a segmented frame representing the background image corresponding to the sample frame in FIG. 8A. For each block (1-7) corresponding to the headlight 82, a local binary pattern (LBP) feature vector (normalized histogram) $v_1''$ in the video frame and the corresponding LBP feature vector in the background image $v_2''$ are computed. Difference feature vectors are computed between the current feature vector and a corresponding feature vector for the same block in a background estimate. The difference feature vectors $v_1''$-$v_2''$ corresponding to blocks representing the headlight are treated as negative samples.

Figure 9A:
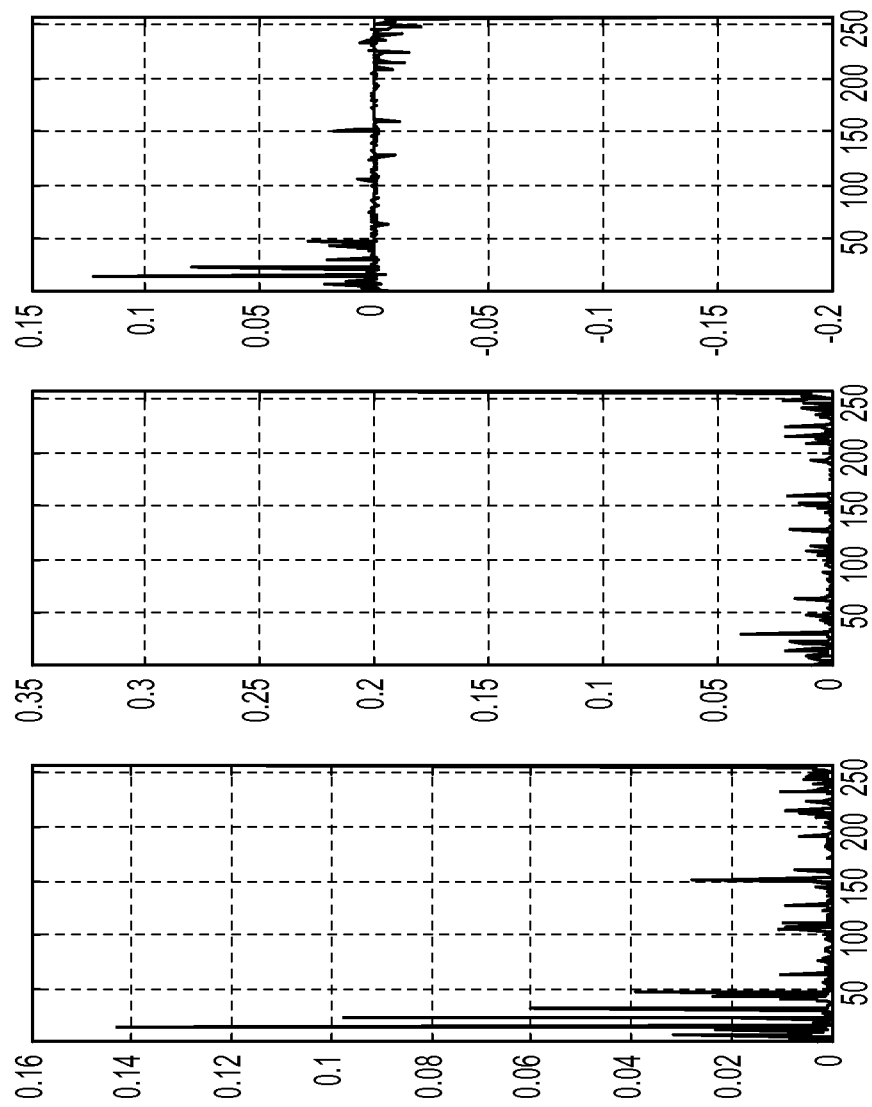
FIGS. 9A-9C show the plots for a local binary pattern (LBP) feature vector in a sample frame, a corresponding LBP feature vector in a background image, and a difference feature vector for positive and negative training samples.
Figure 9B:
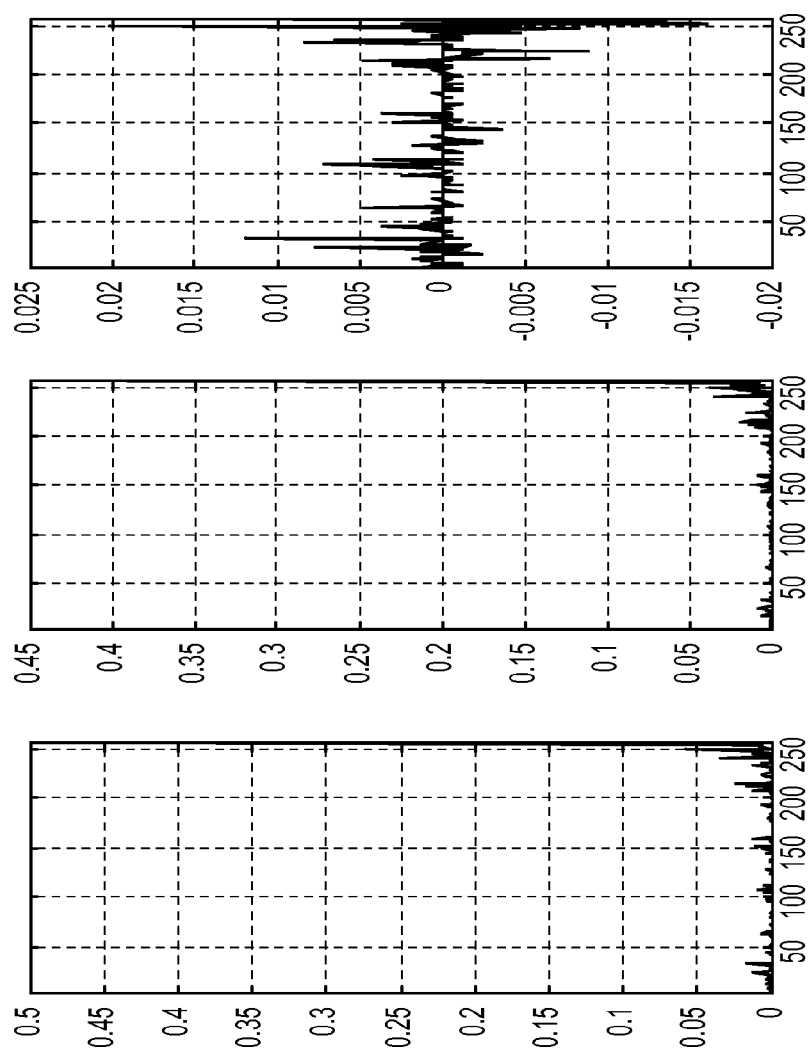
Figure 9C:
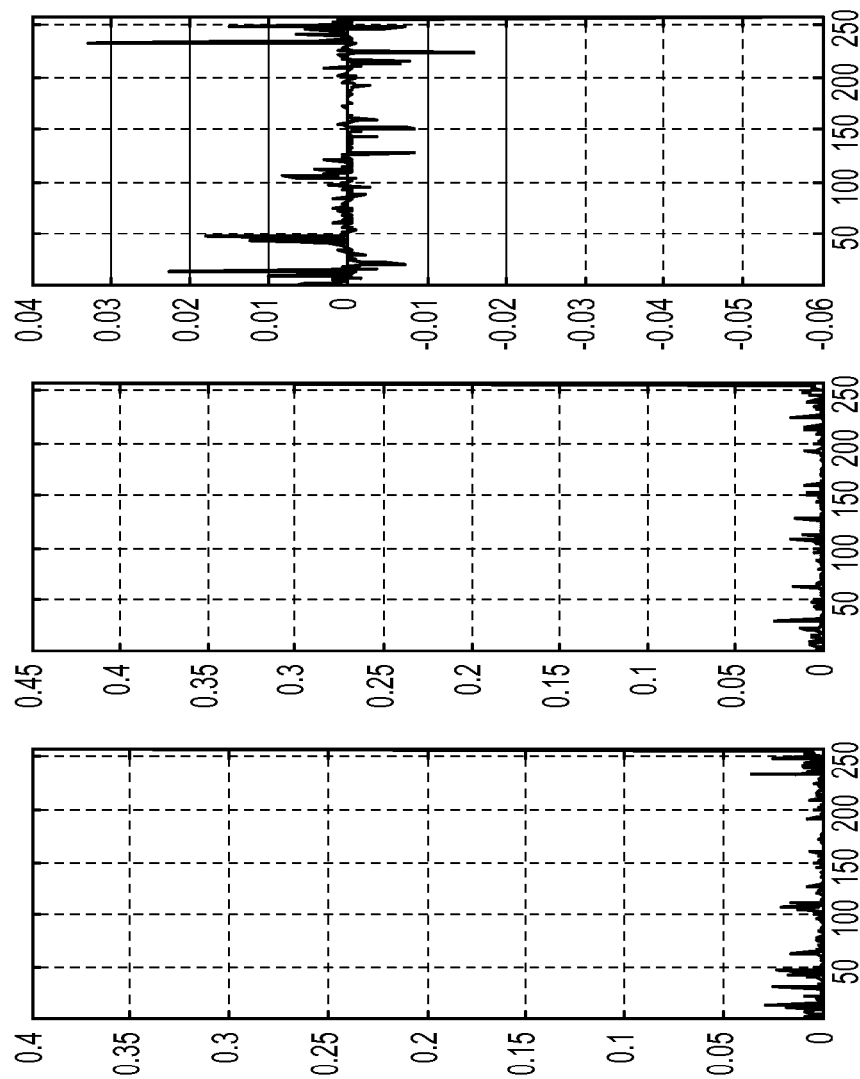

FIGS. 9A-9C shows the plots for a local binary pattern (LBP) feature vector, a corresponding LBP feature vector in a background image, and a difference feature vector for positive sample (FIG. 9A) and negative samples from a headlight (FIG. 9B) and a shadow (FIG. 9C). A conventional texture-based classifier attempts to differentiate the feature vector in the positive sample (FIG. 9A) from the other feature vectors in the negative samples (FIGS. 9B-C) and all of the corresponding background feature vectors in the positive and negative samples of FIGS. 9A-C. The conventional classifier separates non-zero norm vectors from another group of non-zero norm vectors. Therefore, the conventional classifier needs to be retrained when the texture of the background changes.

The proposed method of FIG. 6 remedies this challenge by training the classifier to only distinguish between the difference feature vectors in the positive samples (e.g., FIG. 9A) from the difference feature vectors in the negative samples (e.g., FIGS. 9B-C). In this embodiment, the classifier is trained to separate the non-zero norm samples from (ideally, or close to) zero norm samples. This description that refers to vector norms is only for illustrative purposes, as the classifier relies on the full dimensionality of the feature descriptors to make a decision. Generally, however, the assumption that positive samples tend to have descriptors with non-zero norms and that negative samples tend to have descriptors near the origin holds. This is advantageous because this is true regardless of the nature of the background, which means that the system does not need to be retrained as it is deployed to scenes that differ in appearance.

Returning to FIG. 6, the positive and negative training samples are then used to train the linear support vector machine (SVM) classifier at S620. Use of other classifiers such as neural networks, decision trees or decision networks, and clustering algorithms is possible. The method ends at S622.

Returning to FIG. 5, as mentioned, the false foreground detection removal module 122 receives the first classification mask generated by the comparison module 120 and applies the foreground image to the trained classifier at S518 to distinguish the true foreground object from a false foreground detection. In this manner, only the pixels classified as belonging to the candidate foreground objects—and no pixels belonging to the background background—are applied to the classifier 124, which improves computational efficiency.

In one embodiment, the first mask can be applied to the trained classifier in a block-wise manner. That operation continues to be similar to that described in FIG. 6 related to the training of the classifier. As mentioned above, embodiments are contemplated where the pixel blocks can be segmented into 1×1 pixel blocks each representing a single pixel. The first mask is segmented into a number of pixel blocks at S520. A first feature vector is computed for each pixel block in the current frame at S522. A second, corresponding feature vector is computed for the current background estimate at S524. The second feature vector is subtracted from the first feature vector to obtain a difference feature vector corresponding to the pixel block at S526. The resulting difference feature vector is input into the trained classifier, which outputs a binary decision for each pixel block at S528.

In an embodiment where an SVM is used as a classifier, the SVM learns parameters describing a hyperplane separating the labeled feature representations of the training samples. In response to the difference feature vector being on the foreground side of the hyperplane, the block is classified as belonging to the foreground image. Other classifiers such as clustering-based techniques, neural networks, decision trees or decision networks, etc., can be used. The binary decision is output for each block of the incoming video frame. A "0" (OFF) binary value is output for the blocks belonging to the false foreground detections (i.e., negative samples) and a "1" (ON) binary value is output for the blocks belonging to the true foreground objects (i.e., positive samples).

The binary values are next used to generate a modified classification (binary) mask representing the true foreground image using pixels classified as belonging to the foreground objects at S530. To form the modified mask, a matrix of size N×N pixels is generated with each entry having a binary value of "1" or "0". The pixels assigned zero "0" binary values (or a first value based on an alternative labeling approach) are discarded in the modified mask, and therefore the headlights and/or shadows are removed. The pixels assigned one "1" binary values (or a second value based on an alternative labeling approach) are used to generate the modified mask representing the estimated foreground objects.

Figure 10A:
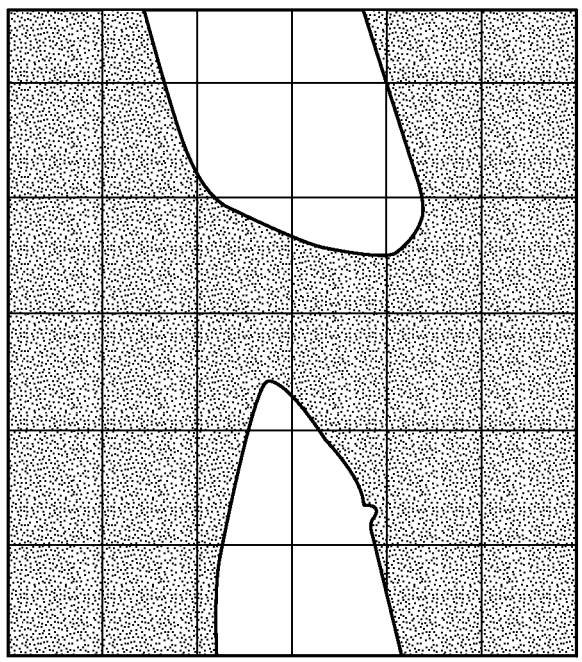
FIGS. 10A-10E show a pictorial operation for generating a binary foreground mask.
Figure 10B:
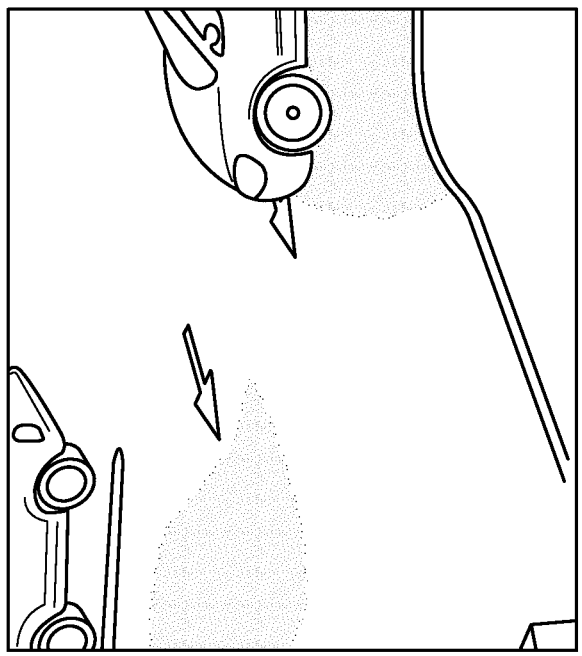
Figure 10E:
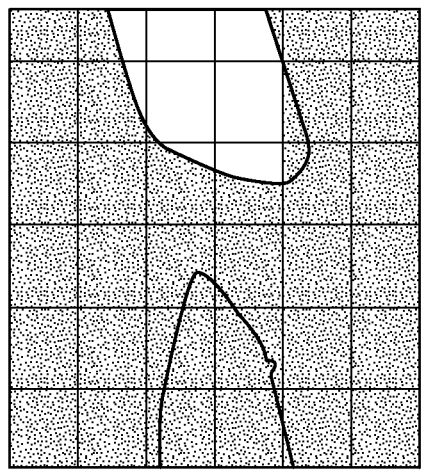
Figure 10D:
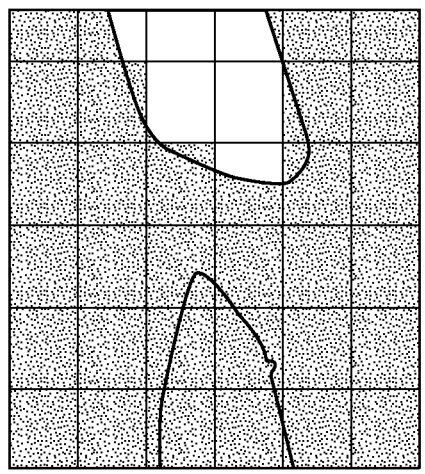
Figure 10C:
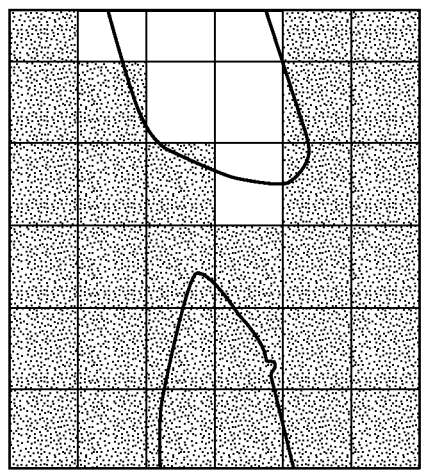

To generate the (modified) binary mask itself, a coarse scale classification (e.g., binary) mask is generated based on the binary decisions at S532. The coarse scale mask is compared to the first mask and redundant pixels are removed at S534. FIG. 10D shows a resulting foreground mask after the coarse scale mask of FIG. 10C is intersected with an original foreground mask (FIG. 10B) generated for a video frame (FIG. 10A). Additionally, morphological operations can be performed, or a convex hull can be computed on the resulting mask to generate the foreground image at S536. FIG. 10E shows an example of the foreground mask of FIG. 10D after a convex hull computation.

This binary mask represents the true foreground objects. The modified binary mask can be provided as output to a user at the GUI. In one embodiment, the modified binary mask can be applied to an algorithm for outputting a determination desired by the selected computer application at S538, such as, the detection or tracking of a foreground object, determination of the presence or absence of shadows or headlights, and determination of visible portions of the background, etc. The disclosure contemplates that the modified classification image can be applied as input in a video-based parking management system, which monitors select areas of interest to provide vehicle detection and (parking) occupancy data. The method ends at S540.

One aspect of the present approach is that it is robust to changes in background texture. The classifier used for classifying pixels in incoming frames does not need to be retrained as a consequence of changes in the background texture because it considers the difference in foreground and/or background texture as input. In other words, the classifier being used by the present system does not rely on the knowledge of absolute background texture, and is thus more scalable than conventional methods.

Furthermore, the present disclosure relies on an intermediate feature space for discrimination, as opposed to the original feature (e.g., LBP) space which does not allow negative entries. Accordingly, one aspect of this reliance is that the system enables a larger margin/discrimination between positive and negative samples. Also, as the system is deployed to scenes of interest with a different appearance, the re-training process of the system can be simplified or altogether avoided.

Another aspect of the present system is that it requires a simpler training process enabled by the discriminative feature space. A conventional classifier working in traditional feature spaces require a substantially larger number of training samples to achieve satisfactory performance. Furthermore, because the classifier is binary and operates on highly discriminative feature space, a manual training procedure is very simple.

One aspect of the block-wise operation disclosed herein is an improved computational efficiency.

Although the control method 300, 500, 600 is illustrated and described below in the form of a series of acts or events, it will be appreciated that the various methods or processes of the present disclosure are not limited by the illustrated ordering of such acts or events. In this regard, except as specifically provided hereinafter, some acts or events may occur in different order and/or concurrently with other acts or events apart from those illustrated and described herein in accordance with the disclosure. It is further noted that not all illustrated steps may be required to implement a process or method in accordance with the present disclosure, and one or more such acts may be combined. The illustrated methods and other methods of the disclosure may be implemented in hardware, software, or combinations thereof, in order to provide the control functionality described herein, and may be employed in any system including but not limited to the above illustrated system 100, wherein the disclosure is not limited to the specific applications and embodiments illustrated and described herein.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for removing false foreground image content in a foreground detection process performed on a video sequence, the method comprising:
   receiving video data from a sequence of frames taken from an associated image capture device monitoring a scene of interest;
   for a current frame, comparing a current feature value of each current pixel against a feature value of a corresponding pixel in a background model of the scene of interest;
   classifying the each current pixel as belonging to one of a candidate foreground image and a background based on the comparing;
   generating a first classification image representing the candidate foreground image using current pixels classified as belonging to the candidate foreground image;
   applying the first classification image to a previously trained classifier in a block-wise manner to generate a binary decision for each pixel-block of the first classification image;
   generating a coarse scale classification image based on the binary decision of the each pixel block;
   generating a modified classification image representing the foreground image by removing redundant pixels between the coarse scale classification image and the first classification image.

2. The method of claim 1, wherein the classifying the each pixel as belonging to the one of the foreground image and background includes:
   performing a comparison of the current feature value in the current frame relative to the corresponding feature value in the background model.

3. The method of claim 1, wherein the false foreground detection includes at least one of a shadow and a light cast from a moving object.

4. The method of claim 1, wherein the applying the first classification image to a previously trained classifier in a block-wise manner to generate a binary decision for each pixel-block includes:
   segmenting the first classification image into pixel blocks;
   for each pixel block, calculating a first feature vector for the current frame;
   calculating a second feature vector for a current background estimate;
   comparing the second feature vector with the first feature vector to obtain a difference feature vector corresponding to the pixel block;
   inputting the resulting difference feature vector to the previously trained classifier; and,
   outputting a classification decision for the each pixel block.

5. The method of claim 1, further comprising:
   computing a convex hull on the modified classification image to generate the foreground image.

6. The method of claim 1, further comprising training the classifier before receiving the video data, the training including:
   locating an object in a sample frame;
   computing a feature of at least one segmented block in the sample frame corresponding to the object;
   computing a difference between the current feature value and a corresponding feature value for a corresponding one of the at least one segmented block in a background estimate;
   labeling each difference as corresponding to one of a foreground object and a false foreground object; and,
   training the classifier using the labeled samples and corresponding difference features.

7. The method of claim 6, wherein the current feature value represents one of a texture and color.

8. The method of claim 6, wherein the current feature value represents a feature that is invariant to monotonic transformations of color intensities.

9. A system for removing false foreground image content in a video sequence, the system comprising a false foreground image detection device including a memory and a processor in communication with the processor configured to:
   receive video data from a sequence of frames taken from an associated image capture device monitoring a scene of interest;
   for a current frame, compare a current feature value of each current pixel against a feature value of a corresponding pixel in a background model of the scene of interest;
   classify the each current pixel as belonging to one of a candidate foreground image and a background based on the comparing;
   generate a first classification image representing the candidate foreground image using current pixels classified as belonging to the candidate foreground image;
   apply the first classification image to a previously trained classifier in a block-wise manner to generate a binary decision for each pixel-block of the first classification image;
   generate a coarse scale classification image based on the binary decision of the each pixel block; and,
   generate a modified classification image representing the foreground image by removing redundant pixels between the coarse scale classification image and the first classification image.

10. The system of claim 9, wherein the processor is further configured to:
    perform a comparison of the current feature value in the current frame relative to a corresponding feature value in the background model for the classifying of the each pixel as belonging to the one of the foreground image and background.

11. The system of claim 9, wherein the false foreground detection includes at least one of a shadow and a light cast from a moving object.

12. The system of claim 9, wherein the processor is further configured to:
    segment the first classification image into pixel blocks;
    for each pixel block, calculate a first feature vector for the current frame;
    calculate a second feature vector for a current background estimate;
    compare the second feature vector with the first feature vector to obtain a difference feature vector corresponding to the pixel block;
    input the resulting difference feature vector to the previously trained classifier; and,
    output a classification decision for the each pixel block.

13. The system of claim 9, wherein the processor is further configured to:
    compute a convex hull on the modified classification image to generate the foreground image.

14. The system of claim 9, wherein the processor is further configured to:
    locate an object in a sample frame;
    compute a feature of at least one segmented block in the sample frame corresponding to the object;

compute a difference between the current feature value and a corresponding feature value for a same block in a background estimate;

label each difference as corresponding to one of a foreground object and a false foreground object; and, train a classifier using the labeled samples and corresponding difference features.

15. The system of claim 14, wherein the current feature value represents one of a texture and color.

16. The system of claim 14, wherein the current feature value represents a feature that is invariant to monotonic transformations of color intensities.

* * * * *